(12) United States Patent
Hawkes et al.

(10) Patent No.: US 8,389,180 B2
(45) Date of Patent: Mar. 5, 2013

(54) ELECTROLYTIC/FUEL CELL BUNDLES AND SYSTEMS INCLUDING A CURRENT COLLECTOR IN COMMUNICATION WITH AN ELECTRODE THEREOF

(75) Inventors: Grant L. Hawkes, Sugar City, ID (US);
James S. Herring, Idaho Falls, ID (US);
Carl M. Stoots, Idaho Falls, ID (US);
James E. O'Brien, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1470 days.

(21) Appl. No.: 11/530,684

(22) Filed: Sep. 11, 2006

(65) Prior Publication Data

US 2008/0063916 A1 Mar. 13, 2008

(51) Int. Cl.
*H01M 4/64* (2006.01)
*H01M 8/00* (2006.01)
*H01M 8/24* (2006.01)
*H01M 2/20* (2006.01)
*C25B 9/00* (2006.01)

(52) U.S. Cl. ........ 429/517; 429/400; 429/452; 429/466; 429/468; 204/260

(58) Field of Classification Search ............ 429/31, 429/400, 452, 466, 468, 517; 204/260
See application file for complete search history.

(56) References Cited

U.S. PATENT DOCUMENTS

| 4,245,009 A | 1/1981 | Guthrie |
| 4,774,153 A | 9/1988 | Sterzel |
| 5,244,752 A | 9/1993 | Zymboly |
| 5,458,989 A | 10/1995 | Dodge |
| 5,509,942 A | 4/1996 | Dodge |
| 5,993,985 A | 11/1999 | Borglum |
| 6,007,932 A | 12/1999 | Steyn |
| 6,217,822 B1 | 4/2001 | Borglum |
| 6,312,847 B1 | 11/2001 | Tsukuda et al. |

(Continued)

FOREIGN PATENT DOCUMENTS

| WO | WO 98/13892 A1 | 4/1998 |
| WO | WO 98/16963 A1 | 4/1998 |

(Continued)

OTHER PUBLICATIONS

Larminie, James, et al., "Fuel Cell Systems Explained," ISBN 0-471-49026-1, John Wiley & Sons, Jan. 2000., pp. 168-172.

(Continued)

*Primary Examiner* — Karie O'Neill Apicella
(74) *Attorney, Agent, or Firm* — TraskBritt

(57) ABSTRACT

Electrolytic/fuel cell bundles and systems including such bundles include an electrically conductive current collector in communication with an anode or a cathode of each of a plurality of cells. A cross-sectional area of the current collector may vary in a direction generally parallel to a general direction of current flow through the current collector. The current collector may include a porous monolithic structure. At least one cell of the plurality of cells may include a current collector that surrounds an outer electrode of the cell and has at least six substantially planar exterior surfaces. The planar surfaces may extend along a length of the cell, and may abut against a substantially planar surface of a current collector of an adjacent cell. Methods for generating electricity and for performing electrolysis include flowing current through a conductive current collector having a varying cross-sectional area.

46 Claims, 8 Drawing Sheets

U.S. PATENT DOCUMENTS

| | | | |
|---|---|---|---|
| 6,358,640 | B1 | 3/2002 | Kendall et al. |
| 6,376,116 | B1 | 4/2002 | Singh et al. |
| 6,379,485 | B1 | 4/2002 | Borlum |
| 6,379,832 | B1 | 4/2002 | Tsukuda et al. |
| 6,416,897 | B1 | 7/2002 | Tomlins et al. |
| 6,436,565 | B1 | 8/2002 | Song et al. |
| 6,444,342 | B1 | 9/2002 | Doshi et al. |
| 6,492,050 | B1 | 12/2002 | Sammes |
| 6,551,735 | B2 * | 4/2003 | Badding et al. .......... 429/31 |
| 6,695,940 | B2 | 2/2004 | Devoe et al. |
| 6,696,187 | B2 | 2/2004 | Kendall et al. |
| 6,824,907 | B2 | 11/2004 | Sarkar et al. |
| 6,841,284 | B2 | 1/2005 | Brown et al. |
| 6,849,353 | B2 * | 2/2005 | Vora et al. ............ 429/31 |
| 6,893,762 | B2 | 5/2005 | Sarkar et al. |
| 6,974,516 | B2 | 12/2005 | Devoe et al. |
| 7,008,709 | B2 | 3/2006 | Keegan et al. |
| 7,008,715 | B2 | 3/2006 | Richardson et al. |
| 7,014,934 | B2 | 3/2006 | Novak |
| 2003/0148160 | A1 | 8/2003 | Song et al. |
| 2004/0121208 | A1 | 6/2004 | James et al. |
| 2004/0126637 | A1 | 7/2004 | Barbezat et al. |
| 2005/0037252 | A1 | 2/2005 | Pham |
| 2005/0095483 | A1 | 5/2005 | Song et al. |
| 2005/0112452 | A1 | 5/2005 | Crumm et al. |
| 2005/0208355 | A1 | 9/2005 | Kaga |
| 2005/0214613 | A1 | 9/2005 | Sarkar et al. |
| 2006/0051643 | A1 | 3/2006 | Sarkar et al. |
| 2006/0246337 | A1 * | 11/2006 | Sarkar et al. ............ 429/34 |
| 2008/0023338 | A1 | 1/2008 | Stoots et al. |

FOREIGN PATENT DOCUMENTS

| | | |
|---|---|---|
| WO | WO 00/54358 | 9/2000 |
| WO | WO 02/21621 A2 | 3/2002 |
| WO | WO 02/31901 A2 | 4/2002 |
| WO | WO 03/069705 A2 | 8/2003 |
| WO | WO 2004/012287 A2 | 2/2004 |
| WO | WO 2004/057695 A2 | 7/2004 |
| WO | WO 2006/017777 A2 | 2/2006 |

OTHER PUBLICATIONS

Fuel Cell Handbook (Seventh Edition), DOE/NETL, Nov. 2004, Chapters 1, 2, and 7.

Guan, J. et al., "High Performance Flexible Reversible Solid Oxide Fuel Cell," GE Global Research Center Final Report for DOE Cooperative Agreement DE-FC36-04GO-14351 (2006).

Haering et al. "Degradation of the electrical conductivity in stabilized zirconia system Part II: Scandia-stabilised zirconia," Solid Sate Ionics, vol. 176, No. 3-4, pp. 261-268, Jan. 2005.

Hawkes et al., "CFD Model of a Planar Solid Oxide Electrolysis Cell for Hydrogen Production from Nuclear Energy," to be presented at the 11th International Topical Meeting on Nuclear Reactor Thermal-Hydraulics NURETH-11, Popes Palace Conference Center, Avignon, France, Oct. 2-6, 2005.

Hawkes et al., "Thermal and Electrochemical Three Dimensional CFD Model of a Planar Solid Oxide Electrolysis Cell," Proceedings, 2005 ASME Heat Transfer Conference, Jul. 17-22, 2005, San Francisco.

Herring et al., "High Temparature Electrolysis for Hydrogen Production Using Nuclear Energy" Paper #501, GLOBAL 2005, Paper#501, Tsukuba, Japan, Oct. 9-13, 2005.

Herring et al., "Hydrogen Production from Nuclear Energy via High-Temperature Electrolysis," Preceedings, 2004 International Conference on Advances in Nuclear Power Plants (ICAPP '04), Jun. 13-17, 2004, Pittsburgh, PA, paper No. 4322.

Herring et al., "Hydrogen Production through High-Temperature Electrolysis in a Solid Oxide Cell," presented at the National Hydrogen Association 15th Annual Conference, Los Angeles, Apr. 26-29, 2004.

Herring et al., "Hydrogen Production through High-Temperature Electrolysis Using Nuclear Power," presented at the AIChE Spring National Meeting, New Orleans, Apr. 25-29, 2004.

Herring et al., "Hydrogen Production through High-Temperature Electrolysis in a Solid Oxide Cell," Second Information Exchange Meeting on Nuclear Production of Hydrogen, Argonne National Laboratory, Oct. 2-3, 2003.

Herring et al., "Progress in High-Temperature Electrolysis for Hydrogen Producton using Planar SOFC Technology," 2005 AIChE Spring Annual Meeting, Apr. 10-14, 2005, Atlanta, GA.

Ni et al., "A Modeling Study on Concentration Overpotentials of a Reversible Solid Oxide Fuel Cell," J. Power Sources, 163, 460NI et al., "A Modeling Study on Concentration Overpotentials of a Reversible Solid Oxide Fuel Cell," J. Power Sources, 163, 460-466. (2006). -466. (2006)

O'Brien et al., "Analysis of Commercial-Scale Implementation of HTE to Oil Sands Recovery," Aug. 15, 2005.

O'Brien et al., "Characterization of Solid-Oxide Electrolysis Cells for Hydrogen Production via High-Temperature Steam Electrolysis," Proceedings, 2nd International Conference on Fuel Cell Science, Engineering, and Technology, Jun. 14-16, 2004, Rochester, NY, paper# 2474, pp. 219-228.

O'Brien et al., "Comparison of a One-Dimensional Model of a High-Temperature Solid-Oxide Electrolysis Stack with CFD and Experimental Results," Proceedings, 2005 ASME International Mechanical Engineering Congress and Exposition, Nov. 5-11, 2005, Orlando.

O'Brien et al., "Design of a 50 kW Integrated Laboratory-Scale High-Temperature Electrolysis Facility," Sep. 15, 2004.

O'Brien et al., "Documentation of INEEL High-Temperature Electrolysis Milestone Demonstrating 50 NL/hr Hydrogen Production Rate," Oct. 2004.

O'Brien et al., Documentation of INL High-Temperature Electrolysis Milestone: Operation of HTE Stack at 100 NL/hr Hydrogen Production Rate for 1000 Hours, Apr. 15, 2006.

O'Brien et al., "Documentation of INL High-Temperature Electrolysis Milestone Demonstrating 100 NL/hr Hydrogen Production Rate," Aug. 1, 2005.

O'Brien et al., "High Temperature Electrolysis Integrated Laboratory Scale Performance, Space and Power Requirements," DOE NHI Milestone Report, Feb. 1, 2006.

O'Brien et al., "High-Temperature Electrolysis for Hydrogen Production From Nuclear Energy," to be presented at the 11th International Topical Meeting on Nuclear Reactor Thermal-Hydraulics NURETH-11, Popes Palace Conference Center, Avignon, France, Oct. 2-6, 2005.

O'Brien et al., "Hydrogen Production from Nuclear Energy via High-Temperature Electrolysis," invited paper, Energy Center Hydrogen Initiative (ECHI) Symposium, Purdue University, Apr. 5-6, 2006.

O'Brien et al., "Hydrogen Production Performance of a 10-Cell Planar Solid-Oxide Electrolysis Stack," Journal of Fuel Cell Science and Technology, vol. 3, pp. 213-219, May 2006.

O'Brien et al., "Hydrogen Production Performance of a 10-Cell Planar Solid-Oxide Electrolysis Stack," Proceedings, ASME 3rd International Conference on Fuel Cell Science, Engineering, and Technology, May 23-25, 2005, Ypsilanti, MI.

O'Brien et al., "Performance Measurements of Solid-Oxide Electrolysis Cells for Hydrogen Production," Journal of Fuel Cell Science and Technology, vol. 2, pp. 156-163, Aug. 2005.

O'Brien et al., "Performance Measurements of Solid-Oxide Electrolysis Cells for Hydrogen Production from Nuclear Energy," Proceedings, 12th ICONE Meeting, Apr. 25-29, 2004, Arlington, VA, paper # ICONE12-49479.

O'Brien et al., "Progress report on analysis of engineering and commercial scale HTE units," Jan. 13, 2005.

O'Brien, J. E., Stoots, C. M., and Herring, J. S., "High Temperature Electrolysis Scaling Demonstration Experiments," Jul. 30, 2004.

Schultz et al., "Fueling the Hydrogen Economy: Status of the US Program for Hydrogen Production using Nuclear Energy," MIT—Tokyo Institute of Technology Symposium on Advance Nuclear Power Systems, Nov. 4, 2005.

Steinberger-Wilkens et al., "Real-SOFC—A Joint European Effort in Understanding SOFC Degradation," ECS Transactions, v 7, n 1 Part 1, ECS Transactions—10th International Symposium on Solid Oxide Fuel Cells, SOFC-X, 2007, pp. 67-76.

Stoots et al., "Conceptual Design Documentation for High-Temperature Electrolysis Pilot-Scale Experiment at 200 kW," Aug. 15, 2005.

Stoots et al., "Engineering Process Model for High-Temperature Electrolysis System Performance Evaluation," May 17, 2005.

Stoots et al., "Engineering Process Model for High-Temperature Steam Electrolysis System Performance Evaluation," AIChE 2005 Annual Meeting, Cincinnati, Oct. 30-Nov. 4, 2005.

Stoots et al., "High Temperature Electrolysis System Configuration Study," Jun. 30, 2004.

Stoots et al., "Integral Laboratory Scale Stack Specification Mechanical Design Report," Aug. 15, 2006.

Williams et al., "Solid oxide fuel cell technology development in the US," Solid State Ionics, V. 177, No. 19-25, pp. 2039-2044, Oct. 2006.

Elangovan et al., "Operation and Analysis of SOFCs in Steam Electrolysis Mode," Proceedings, 6th European Solid Oxide Fuel Cell Forum, Kultur- und Kongresszentrum Luzern, Lucerne, Switzerland, Jun. 28-Jul. 2, 2004.

O'Brien et al., "Performance Characterization of Solid-Oxide Electrolysis Cells for Hydrogen Production," Proceedings, 2nd International Conference on Fuel Cell Science, Engineering, and Technology, 2004, 10 pages.

\* cited by examiner

ELECTROLYTIC/FUEL CELL BUNDLES AND SYSTEMS INCLUDING A CURRENT COLLECTOR IN COMMUNICATION WITH AN ELECTRODE THEREOF

GOVERNMENT RIGHTS

This invention was made with government support under Contract No. DE-AC07-05ID14517 awarded by the United States Department of Energy. The government has certain rights in this invention.

FIELD OF THE INVENTION

The present invention relates to fuel cells and electrolytic cells, and more particularly, to configurations of bundles of such fuel cells and electrolytic cells. The present invention also relates to methods for generating electricity using such bundles of fuel cells, and to performing electrolysis using such bundles of electrolytic cells. Furthermore, the present invention relates to methods of forming bundles of fuel cells and bundles of electrolytic cells.

BACKGROUND OF THE INVENTION

Fuel cells are electrochemical devices that convert the chemical energy of a reaction directly into electrical energy. The basic physical structure of a fuel cell includes a porous anode, a porous cathode, and an electrolyte layer disposed between the porous anode and the porous cathode. The electrolyte layer is in immediate physical contact with both the anode and the cathode. A basic schematic diagram of a fuel cell is shown in FIG. 1. As illustrated therein, in a conventional fuel cell, fuel is fed continuously to the porous anode and an oxidant is fed continuously to the porous cathode.

Various fuels and oxidants are known in the art. As one example, the fuel may include hydrogen gas and the oxidant may include oxygen from air. In such a fuel cell, the reaction occurring at the anode is shown in Reaction [1] below, the reaction occurring at the cathode is shown in Reaction [2] below, and the overall reaction is shown in Reaction [3] below.

$$H_2 + O^{2-} \rightarrow H_2O + 2e^-  \qquad [1]$$

$$\tfrac{1}{2}O_2 + 2e^- \rightarrow O^{2-} \qquad [2]$$

$$H_2 + \tfrac{1}{2}O_2 \rightarrow H_2O \qquad [3]$$

The negatively charged oxygen ions generated by the cathode migrate through the electrolyte layer from the cathode to the anode, while the electrons travel through the external circuit from the anode to the cathode.

A background description of fuel cells can be found in Chapters 1 and 2 of the Fuel Cell Handbook, Seventh Edition, which was prepared by EG&G Technical Services, Inc. for the United States Department of Energy and published in November of 2004, the entire contents of which Chapters are incorporated herein in their entirety by this reference.

One particular type of fuel cell is the solid oxide fuel cell (SOFC). In a conventional solid oxide fuel cell, the electrolyte layer includes a solid, non-porous metal oxide, typically perovskites, such as yttria-stabilized zirconia (i.e., $Y_2O_3$-stabilized $ZrO_2$, which is often abbreviated "YSZ"). The anode may be a ceramic-metal composite material (i.e., a "cermet" material), such as a Ni—$ZrO_2$ cermet material or a Ni—YSZ cermet material, and the cathode may be a lanthanum-based perovskite material, such as Sr-doped $LaMnO_3$. A solid oxide fuel cell is conventionally operated at temperatures between about 600° C. and about 1000° C., at which the electrolyte layer exhibits ionic conduction (typically conduction of oxygen ions). Solid oxide fuel cells can be used with a wide range of fuels, in addition to hydrogen gas, including hydrocarbon fuels.

One particular type of solid oxide fuel cell is the tubular solid oxide fuel cell. As the name implies, the tubular solid oxide fuel cell has a tubular structure. A cross-section of a typical single tubular solid oxide fuel cell 10 is shown in FIG. 2. As shown therein, the tubular solid oxide fuel cell 10 includes a generally cylindrical air electrode 12, a generally cylindrical electrolyte layer 14 disposed concentrically over the air electrode 12, and a generally cylindrical fuel electrode 16 disposed concentrically over the electrolyte layer 14. The air electrode 12 may be the cathode and the fuel electrode 16 may be the anode. In this configuration, the fuel may be passed over the external surface 17 of the fuel electrode 16, and air may be introduced into the interior of the tubular solid oxide fuel cell 10 so as to contact the interior surface 13 of the air electrode 12. An air supply tube 20 may be used to introduce the air into the interior of the tubular solid oxide fuel cell 10. As shown in FIG. 2, the electrolyte layer 14 and the fuel electrode 16 may extend only partially around the air electrode 12 to allow an interconnect structure 24 and contact material 26 to be provided on an exposed region of the air electrode 12. For example, the interconnect structure 24 may include a conductive ceramic (such as lanthanum and yttrium chromites doped with elements such as Mg, Sr, Ca, and/or Co) in a fuel cell 10 operating at relatively high temperatures, or the interconnect structure 24 may include a conductive metal or metal alloy in a fuel cell 10 operating at relatively low temperatures. The contact material 26 may include nickel felt, for example. The interconnect structure 24 and the contact material 26 may extend substantially along the length of the tubular solid oxide cell 10, and may be used to interconnect the tubular solid oxide fuel cell 10 with another substantially similar tubular solid oxide fuel cell 10, as described in further detail below.

Referring to FIG. 3, a fuel cell system 30 may include a stack of tubular solid oxide fuel cells 10. The stack may include a number of rows and columns of tubular solid oxide fuel cells 10. While the fuel cell system 30 shown in FIG. 3 includes six tubular solid oxide fuel cells 10, fuel cell systems 30 may include tens or even hundreds of individual solid oxide fuel cells 10. As shown in FIG. 3, the fuel electrode 16 (or whichever of the air electrode 12 and the fuel electrode 16 is disposed on the outside of the fuel cell 10) of each fuel cell 10 may be electrically connected to the air electrode 12 of an adjacent fuel cell 10 through the interconnect structure 24 and contact material 26 of the adjacent fuel cell 10. In other words, as the fuel cells 10 are stacked together, electrical contact is established between the fuel electrode 16 and the interconnect structure 24 of an adjacent fuel cell 10 through the contact material 26.

The air electrodes 12 of each fuel cell 10 in one end row 34 in the stack may be electrically connected to a cathode bus 40, and the fuel electrodes 16 of each fuel cell 10 in an opposite end row 36 may be electrically connected to an anode bus 42. In this configuration, each of the fuel cells 10 in each column may be electrically connected in series between the cathode bus 40 and the anode bus 42. Furthermore, the fuel electrodes 16 (or whichever of the air electrode 12 and the fuel electrode 16 is disposed on the outside of the fuel cell 10) of the fuel cells 10 in each row may be electrically connected together using additional contact material 26. In this configuration, each of the fuel cells 10 in each row may be electrically connected in parallel. The operating voltage of a fuel cell system, such as the fuel cell system 30 shown in FIG. 3, may be increased by increasing the number of individual fuel cells 10 electrically connected in series in each column between the cathode bus 40 and the anode bus 42, and the operating current may be increased by increasing the number of individual fuel cells 10 electrically connected in parallel in each row.

FIG. 4 is a schematic diagram further illustrating operation of a conventional tubular solid oxide fuel cell system, such as the fuel cell system 30 shown in FIG. 3. As shown in FIG. 4, each of the tubular solid oxide fuel cells 10 may have an open end 46 and a closed end 48. A majority of the length of each fuel cell 10 may be enclosed in a fuel chamber 60 defined by a housing or container 50. The open end 46 of each fuel cell 10 may extend through a first barrier or plate 52 and a second barrier or plate 54 and into a combustion chamber 64. The first plate 52 and the second plate 54 may define a recirculation chamber 62 therebetween that communicates with the fuel chamber 60 proximate an inlet 61 thereof.

Deliberately imperfect seals may be provided between the outer surface of each fuel cell 10 and each of the first plate 52 and the second plate 54. In such a configuration, at least some unreacted fuel may be allowed to pass between the outer surface of each fuel cell 10 and the first plate 52, into the recirculation chamber 62, and back into the fuel chamber 60. Furthermore, at least some unreacted fuel may be allowed to pass from the recirculation chamber 62, between the exterior surface of each fuel cell 10 and the second plate 54, and into the combustion chamber 64.

An air supply tube 20 may extend into the interior region of each fuel cell 10 for supplying air thereto. Each air supply tube 20 may have an open end 21 positioned proximate the closed end 48 of each respective fuel cell 10. In this configuration, air may be caused to flow through the interior region of each fuel cell 10 from the closed end 48 thereof generally towards the open end 46. As unreacted air exits from the open end 46 of each fuel cell 10 into the combustion chamber 64, the unreacted air may mix with unreacted fuel and caused to combust. The combustion chamber 64 may be positioned proximate the inlet 61 to the fuel chamber 60 such that the heat generated by the combustion of the unreacted air and the unreacted fuel may be used to preheat the fuel entering into the fuel chamber 60, and to facilitate heating of the fuel cells 10 to the operating temperature of the fuel cell system 30.

Fuel cells are closely related to electrolytic cells, and many fuel cells can be operated as an electrolytic cell for performing electrolysis of a substance by replacing the external circuit associated with the fuel cell with a voltage source (such as, for example, a battery), providing a substance to be electrolyzed in contact with the anode and the cathode, and applying a voltage between the anode and the cathode using the voltage source. For example, water may be provided in contact with the anode and the cathode, and a voltage may be applied between the anode and the cathode, which may cause oxygen gas to be formed at the anode and hydrogen gas to be formed at the cathode.

BRIEF SUMMARY OF THE INVENTION

In one embodiment, the present invention includes an electrolytic/fuel cell bundle that includes an electrically conductive current collector in electrical and structural communication with an outer electrode of each cell of a plurality of generally tubular cells. A cross-sectional area of the current collector varies in a direction generally parallel to a general direction of current flow through the current collector.

In another embodiment, the present invention includes an electrolytic/fuel cell bundle that includes a plurality of cells, at least one of which includes a generally cylindrical inner electrode, a generally cylindrical outer electrode, an electrolyte layer disposed between the inner electrode and the outer electrode, and a current collector substantially surrounding the outer electrode. The current collector includes four, or more, substantially planar exterior surfaces that are circumferentially spaced around the at least one cell. Each of the substantially planar exterior surfaces abuts against a substantially planar exterior surface of a current collector of an adjacent cell of the plurality of cells.

In an additional embodiment, the present invention includes a system for generating electrical power. The system includes at least one electrolytic/fuel cell bundle, a reductant source, and an oxidant source. The at least one electrolytic/fuel cell bundle includes an electrically conductive current collector in electrical and structural communication with an outer electrode of each cell of a plurality of generally tubular cells. A cross-sectional area of the current collector varies in a direction generally parallel to a general direction of current flow through the current collector.

In another embodiment, the present invention includes a system for generating electrical power. The system includes at least one electrolytic/fuel cell bundle, a reductant source, and an oxidant source. The at least one electrolytic/fuel cell bundle includes a plurality of cells, at least one of which includes a generally cylindrical inner electrode, a generally cylindrical outer electrode, an electrolyte layer disposed between the inner electrode and the outer electrode, and a current collector substantially surrounding the outer electrode. The current collector includes four, or more, substantially planar exterior surfaces that are circumferentially spaced around the at least one cell. Each of the substantially planar exterior surfaces abuts against a substantially planar exterior surface of a current collector of an adjacent cell of the plurality of cells.

In yet another embodiment, the present invention includes a method of generating electricity. The method includes supplying a reductant to a side of an anode of each of a plurality of cells opposite an electrolyte layer of each cell of the plurality of cells, supplying an oxidant for oxidizing the reductant to a side of a cathode of each cell of the plurality of cells opposite the electrolyte layer of each cell of the plurality of cells. Electrical communication is provided through an external circuit between the anode and the cathode of each cell of the plurality of cells. To provide such electrical communication, an electrically conductive current collector is provided in electrical and structural communication with at least one of the anode and the cathode of each cell of the plurality of cells. A cross-sectional area of the current collector varies in a direction generally parallel to a direction of current flow through the current collector.

In an additional embodiment, the present invention includes a method of performing electrolysis. A substance to be electrolyzed is provided in contact with an anode and a cathode of each cell of a plurality of cells, and a voltage is provided between the anode and the cathode of each cell of the plurality of cells. As the voltage is provided between the anode and the cathode of each cell of the plurality of cells, current flows through a conductive current collector in electrical and structural communication with at least one of the anode and the cathode of each cell of the plurality of cells. A cross-sectional area of the current collector increases in a direction generally parallel to a direction of current flow through the current collector.

In another embodiment, the present invention includes an electrolytic/fuel cell bundle that includes a porous substantially monolithic current collector in electrical and structural communication with an outer electrode of each cell of a plurality of generally tubular cells.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

The illustrations presented herein are not meant to be actual views of any particular electrolytic/fuel cell bundle, but are merely idealized representations which are employed to describe the present invention. Additionally, elements common between figures may retain the same numerical designation.

As used herein, the term "electrolytic/fuel cell bundle" means a bundle of cells, each of which cell includes an anode and a cathode and is operable as at least one of a fuel cell and an electrolytic cell.

Figure 1:
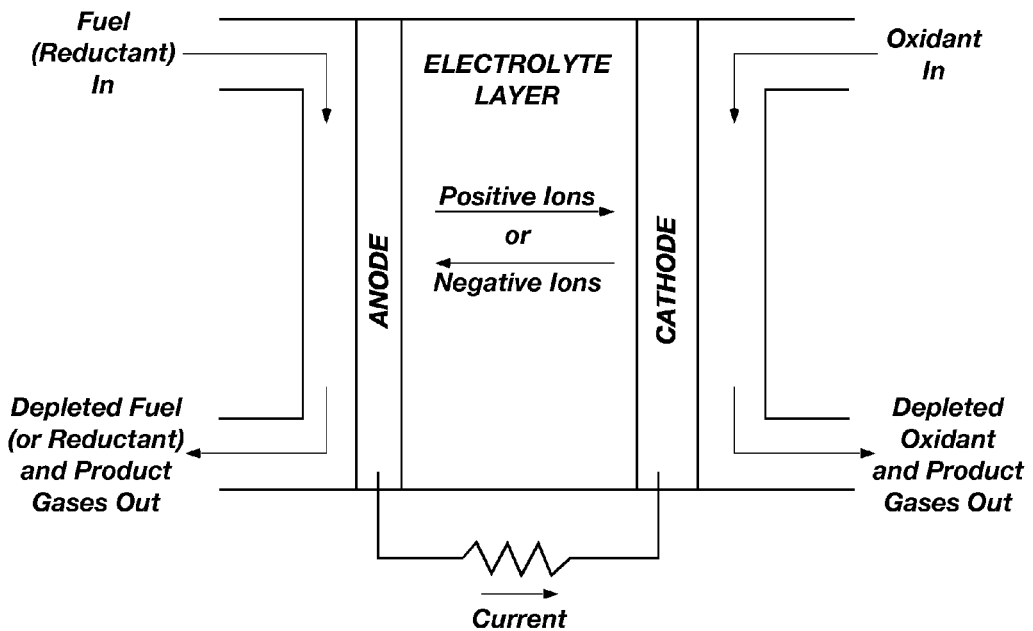
FIG. 1 is a schematic diagram of a fuel cell illustrating basic principles of operation thereof.
Figure 2:
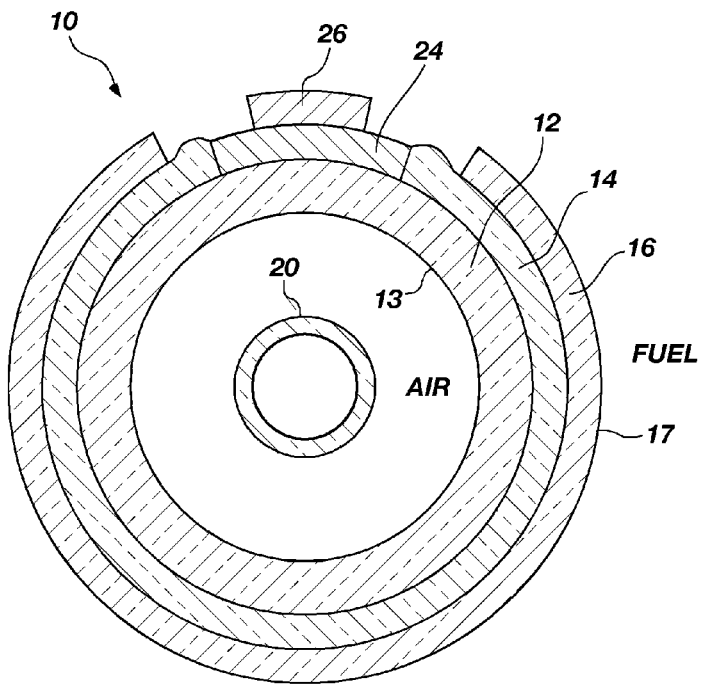
FIG. 2 is a cross-sectional view of a single solid oxide fuel cell having a configuration that is known in the art.
Figure 3:
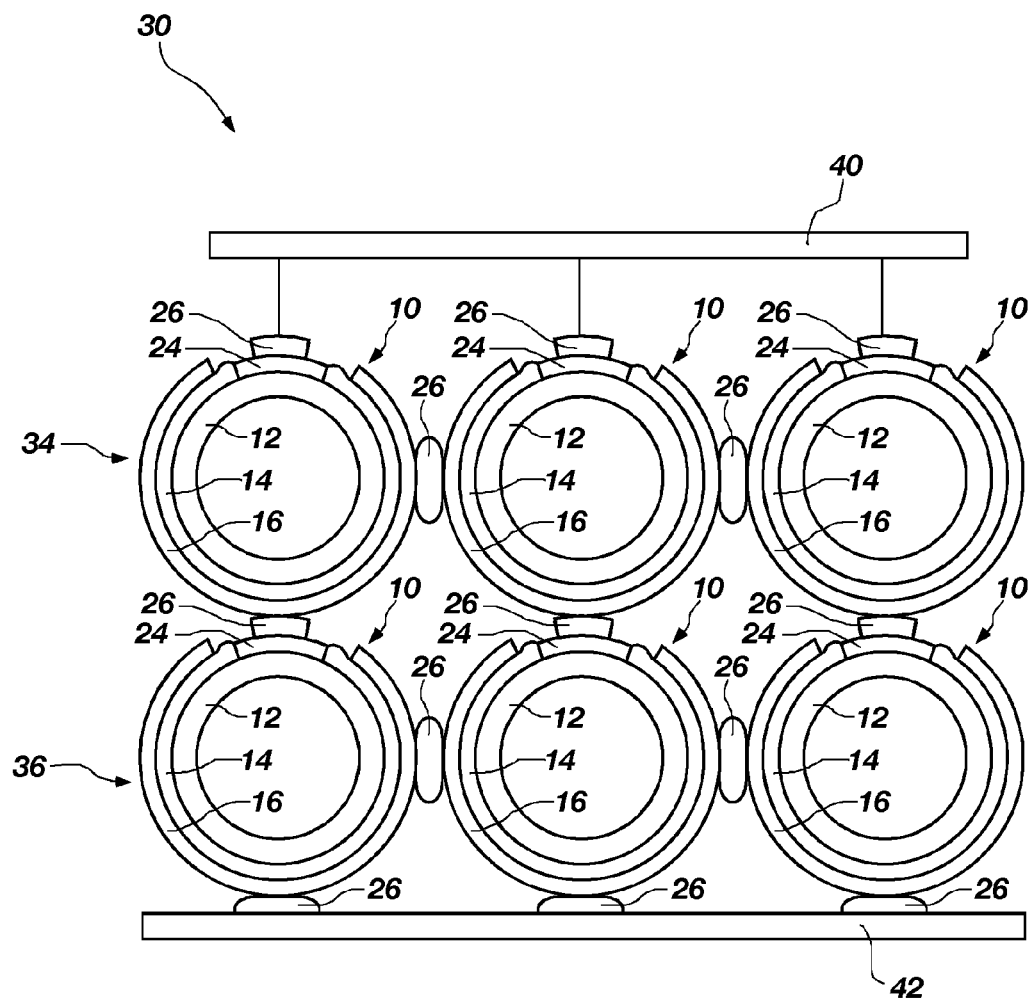
FIG. 3 is a cross-sectional view of an electrolytic/fuel cell bundle that includes a plurality of fuel cells like those shown in FIG. 2.
Figure 4:
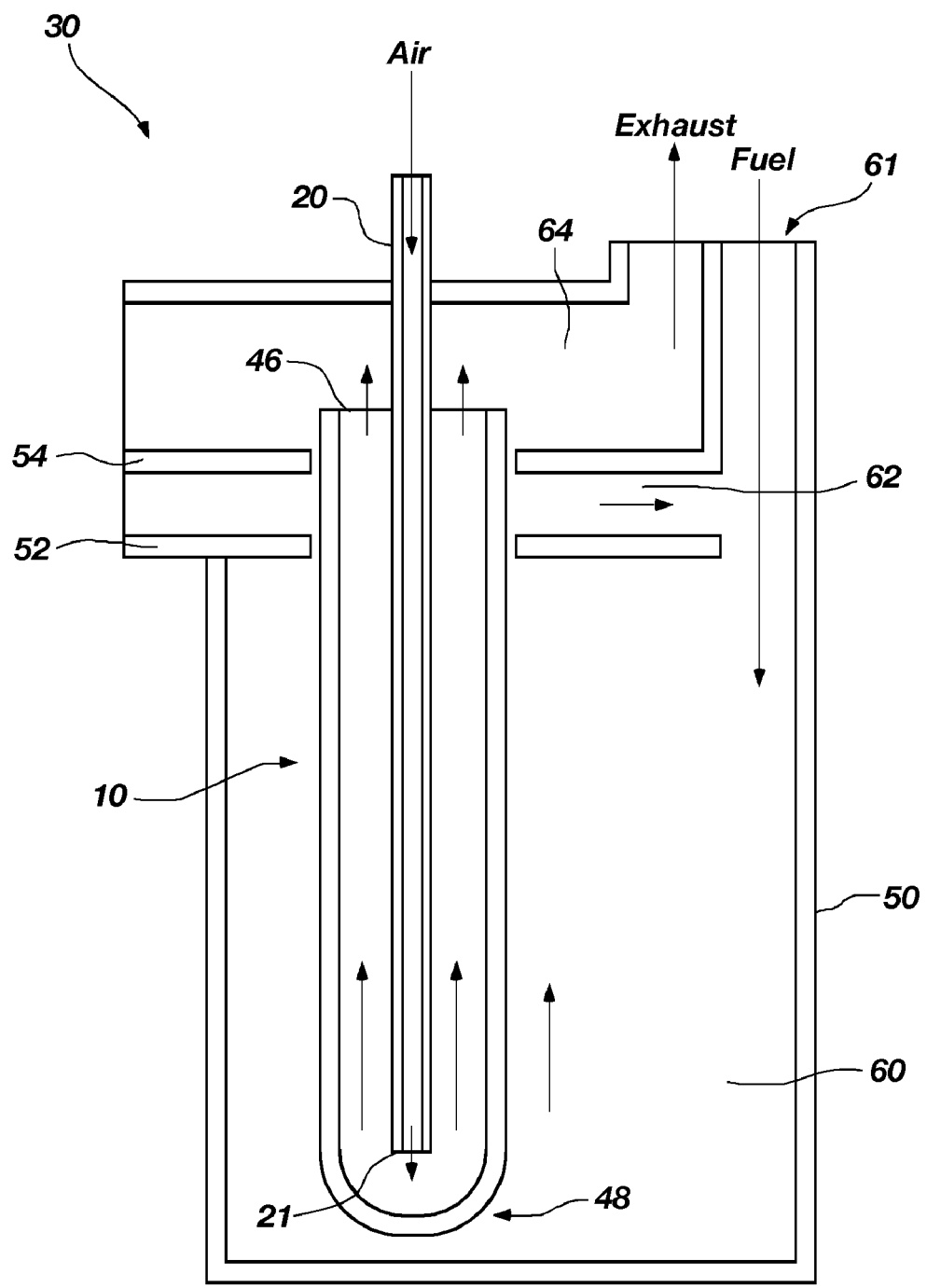
FIG. 4 is a schematic diagram illustrating a portion of a fuel cell system illustrating basic principles of operation thereof.
Figure 5A:
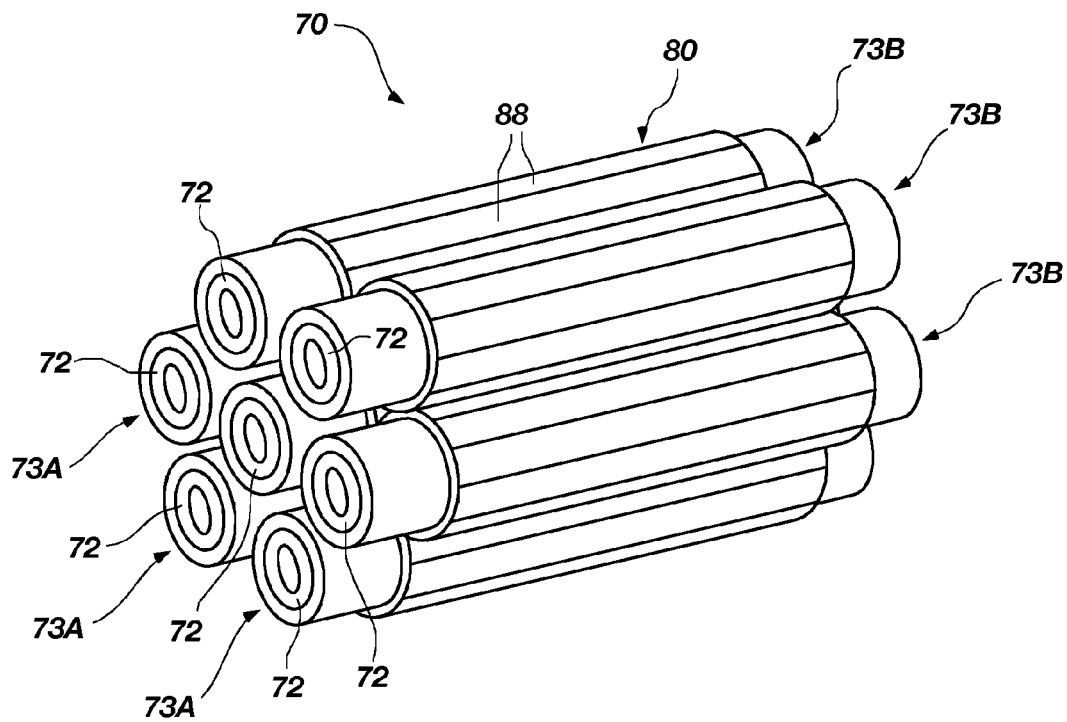
FIG. 5A is a perspective view of one example of an electrolytic/fuel cell bundle that embodies teachings of the present invention and includes a plurality of individual current collectors that each include flat or planar exterior surfaces and are stacked in a hexagonal pattern.
Figure 5B:
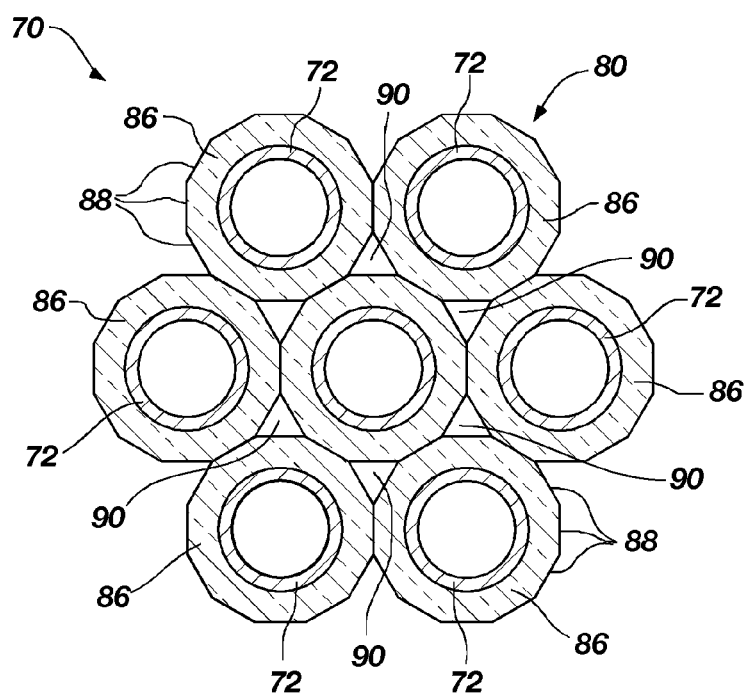
FIG. 5B is a cross-sectional view of the electrolytic/fuel cell bundle shown in FIG. 5A.

FIG. 5A is a perspective view of one example of an electrolytic/fuel cell bundle 70 that embodies teachings of the present invention. The electrolytic/fuel cell bundle 70 may be used, for example, in a solid oxide fuel cell system similar to the fuel cell system 30 shown in FIG. 4. FIG. 5B is a cross-sectional view of the electrolytic/fuel cell bundle 70 shown in FIG. 5A, and FIG. 5C is an enlarged view of a portion of FIG. 5B illustrating the inner electrode 74, outer electrode 76, and electrolyte layer 78 of one cell 72 of the electrolytic/fuel cell bundle 70 (the inner electrode 74, outer electrode 76, and electrolyte layer 78 of each of the cells 72 are not illustrated in FIGS. 5A-5B due to their relatively small size).

Referring to FIG. 5A, the electrolytic/fuel cell bundle 70 includes a plurality of cells 72, each of which may have a hollow, generally cylindrical tubular shape. The electrolytic/fuel cell bundle 70 further includes an electrically conductive current collector 80, which may be in direct electrical and structural communication with the outer electrode 76 of each of the cells 72 in the electrolytic/fuel cell bundle 70. In some embodiments, the current collector 80 may have a cross-sectional area that increases in a direction generally parallel to a direction of current flow through the current collector 80, as will be discussed in further detail below.

Figure 5C:
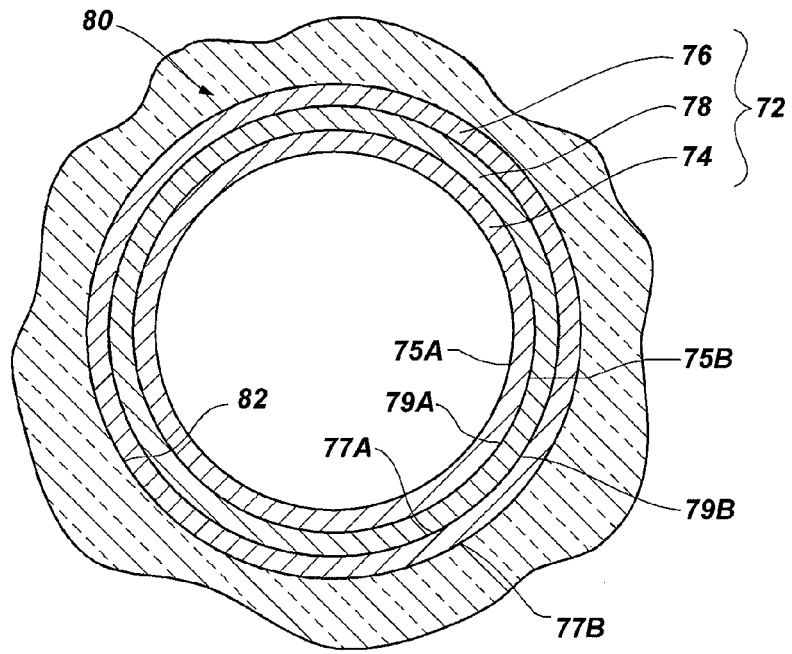
FIG. 5C is an enlarged view of a portion of the electrolytic/fuel cell bundle shown in FIG. 5B illustrating various components of a cell thereof.

Referring to FIG. 5C, each of the cells 72 may include an inner electrode 74, an outer electrode 76, and an electrolyte layer 78 disposed between the inner electrode 74 and the outer electrode 76. In some embodiments, the inner electrode 74 of each cell 72 may include an anode and the outer electrode 76 of each cell 72 may include a cathode. In additional embodiments, the inner electrode 74 of each cell 72 may include a cathode and the outer electrode 76 of each cell 72 may include an anode. Each inner electrode 74 may have a radially inner surface 75A and a radially outer surface 75B, each outer electrode 76 may have a radially inner surface 77A and a radially outer surface 77B, and each electrolyte layer 78 may have a radially inner surface 79A and a radially outer surface 79B. Each electrolyte layer 78 may be disposed concentrically around an inner electrode 74 such that the inner surface 79A of each electrolyte layer 78 is disposed adjacent an outer surface 75B of an inner electrode 74. Similarly, each outer electrode 76 may be disposed concentrically around an electrolyte layer 78 such that the inner surface 77A of each outer electrode 76 is disposed adjacent an outer surface 79B of an electrolyte layer 78. The outer surface 77B of each outer electrode 76 may be disposed adjacent an interior surface 82 of the current collector 80. Each of the interior surfaces 82 of the current collector 80 may have a generally cylindrical shape.

By way of example and not limitation, the inner electrode 74 may be or include an anode and may include at least one of a metal-ceramic composite (cermet) material (for example, a cermet comprising nickel and yttria-stabilized zirconia (YSZ)), a precious metal (for example, silver, platinum, gold, and alloys of such metals), or a transition metal (for example, iron and nickel, as well as alloys of such metals). The inner electrode 74 may be substantially porous, and may have a pore size gradient including relatively larger pores on the side thereof proximate the inner surface 75A thereof and relatively smaller pores on the side thereof proximate the outer surface 75B thereof (the surface adjacent the electrolyte layer 78).

The inner electrode 74 may have a thickness in a range extending from about ten microns up to several millimeters.

The outer electrode 76 may be or include a cathode and may include, for example, a perovskite material doped with lanthanum or strontium (e.g., manganites doped with lanthanum or strontium, lanthanum ferrite doped with strontium, etc.). The outer electrode 76 also may be substantially porous, and may have a pore size gradient. The outer electrode 76 also may have a thickness in a range extending from about ten microns up to several millimeters.

The electrolyte layer 78 may be or include a solid oxide ceramic material such as, for example, an yttria-stabilized zirconia (YSZ) (e.g., between about 3 percent and about 10 percent yttria), scandium-doped zirconia (SDZ), gadolinium-doped ceria, lanthanum gallate, or other perovskite material. The electrolyte layer 78 may have a thickness of between about five microns and about 100 microns.

The current collector 80 may be or include a material such as, for example, a conductive ceramic material. By way of example and not limitation, the current collector 80 may include a conductive perovskite material (e.g., lanthanum chromites and/or yttrium chromites doped with at least one of magnesium, strontium, calcium, and cobalt. In additional embodiments, the current collector 80 may be or include a material such as, for example, a conductive metal material (e.g., chrome and chrome alloys, iron and iron alloys, porous stainless steel, etc.) In some embodiments, the current collector 80 may be porous to enable an oxidant or a reductant to flow through the pores of the current collector 80 to the outer surface 77B of the outer electrode 76.

In some embodiments, the current collector 80 may be formed or otherwise provided prior to providing or forming the cells 72 therein. Each of the cells 72 may be formed or otherwise provided within the interior regions of the current collector 80 defined by the interior surfaces 82. By way of example and not limitation, each outer electrode 76 may be formed on an interior surface 82 of the current collector 80, the electrolyte layer 78 may be formed on the inner surface 77A of the outer electrode 76, and the inner electrode 74 then may be formed on the inner surface 79A of the electrolyte layer 78.

In additional embodiments, the cells 72 may be formed and aligned with one another prior to forming the current collector 80 around and between the cells 72. By way of example and not limitation, the inner electrodes 74 may be formed, and the electrolyte layers 78 may be formed over the outer surfaces 75B of the inner electrodes 74. The outer electrodes 76 then may be formed over the outer surfaces 79B of the electrolyte layers 78, and the current collector 80 may be formed around and between the cells 72.

As shown in FIGS. 5A and 5B, the current collector 80 may include a plurality of individual current collectors 86 that are stacked together and electrically interconnected to form the current collector 80. Each of the individual current collectors 86 may correspond to one cell 72, and each may have a plurality of generally planar exterior surfaces 88, which may extend generally along the length of the individual current collectors 86. In the embodiment shown in FIGS. 5A and 5B, each of the individual current collectors 86 includes twelve generally planar exterior surfaces 88. In this configuration, the individual current collectors 86 may be stacked in a hexagonal pattern, and the generally planar exterior surfaces 88 of each individual current collector 86 may be configured to abut against a generally planar exterior surface 88 of the adjacent, nearest-neighbor individual current collectors 86. Furthermore, elongated channels 90 may be provided between the adjacent, nearest-neighbor individual current collectors 86, as shown in FIG. 5B. In this configuration, a reductant (e.g., fuel) or an oxidant (e.g., air) may be caused to flow through the elongated channels 90, as well as over the exterior surfaces of the current collector 80, during operation of the cells 72 of the electrolytic/fuel cell bundle 70.

Referring again to FIG. 5A, each of the cells 72 may have a first open end 73A and an opposite, second closed end 73B, which may be substantially similar to the open end 46 and the closed end 48 of the fuel cell 10, which is described above in relation to FIG. 4. The inner electrodes 74 (FIG. 5C) of each of the cells 72 of the electrolytic/fuel cell bundle 70 may be electrically interconnected with one another at, for example, the open ends 73A thereof (using, for example, electrical wires (not shown)). The outer electrodes 76 of each of the cells 72 of the electrolytic/fuel cell bundle 70 may be electrically interconnected with one another by the current collector 80. In this configuration, each of the inner electrodes 74 of the cells 72 may be provided at the same electrical potential, and the outer electrodes 76 of the cells 72 may be provided at the same electrical potential. In this manner, a substantially similar voltage may be provided between the inner electrode 74 and the outer electrode 76 in each of the cells 72 of the electrolytic/fuel cell bundle 70.

At least one electrolytic/fuel cell bundle 70 may be used in a fuel cell system that embodies teachings of the present invention to generate electricity, or in an electrolysis system that embodies teachings of the present invention to perform electrolysis. In some embodiments, a fuel cell system or an electrolysis system may include a plurality of substantially identical electrolytic/fuel cell bundles 70, some of which may be electrically connected in parallel (e.g., the current collector 80 of a first electrolytic/fuel cell bundle 70 electrically interconnected directly to the current collector 80 of a second electrolytic/fuel cell bundle 70, and the inner electrodes 74 of the first electrolytic/fuel cell bundle 70 electrically interconnected directly to the inner electrodes 74 of the second electrolytic/fuel cell bundle 70), and some of which may be electrically connected in series (e.g., the inner electrodes 74 of a first electrolytic/fuel cell bundle 70 electrically interconnected to a first current bus, the current collector 80 of the first electrolytic/fuel cell bundle 70 electrically interconnected directly to the inner electrodes 74 of a second electrolytic/fuel cell bundle 70, and the current collector 80 of the second electrolytic/fuel cell bundle 70 electrically interconnected to a second current bus). By selectively tailoring the number of electrolytic/fuel cell bundles 70 that are electrically interconnected in series in a fuel cell system or an electrolysis system that embodies teachings of the present invention, the operating voltage thereof may be selectively tailored. Similarly, by selectively tailoring the number of electrolytic/fuel cell bundles 70 that are electrically interconnected in parallel in a fuel cell system or an electrolysis system that embodies teachings of the present invention, the operating current thereof may be selectively tailored.

Figure 6:
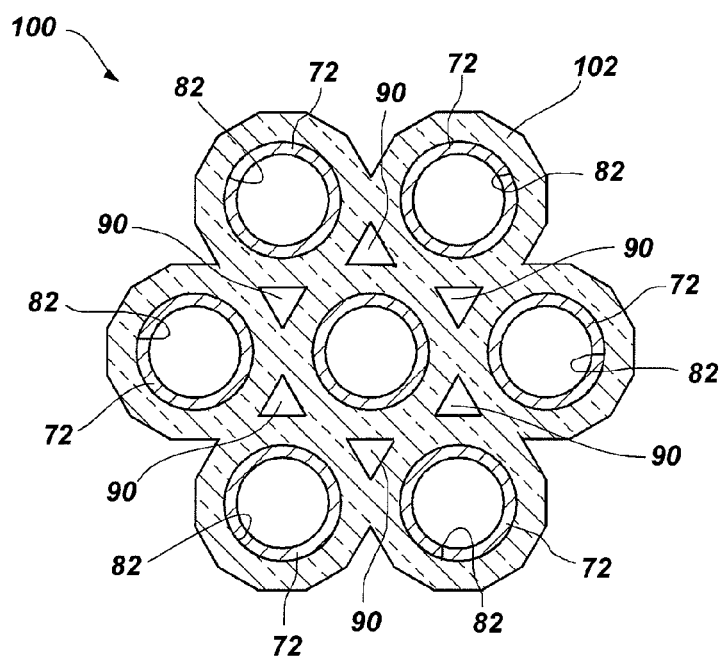
FIG. 6 is a cross-sectional view of another example of an electrolytic/fuel cell bundle that embodies teachings of the present invention and includes a monolithic current collector.

FIG. 6 is a cross-sectional view of another electrolytic/fuel cell bundle 100 that embodies teachings of the present invention and that includes a current collector 102 having a monolithic unitary structure that substantially surrounds each of a plurality of cells 72. The current collector 102 is otherwise substantially identical to the current collector 80 previously described in relation to FIGS. 5A and 5B and includes a plurality of interior surfaces 82 defining regions in which the cells 72 are disposed, as well as elongated channels 90 that extend through the current collector 102.

By way of example and not limitation, the current collector 102 may be formed by extruding a precursor material through a die and pin assembly, the die of which assembly defines the exterior surfaces of the current collector 102, and the pins of which assembly define the interior surfaces 82 and the elongated channels 90 of the current collector 102. Extrusion machines for extruding such precursor materials are known in the art and commercially available. The extruded precursor material then may be consolidated to form the current collector 80. For example, the precursor material may comprise particles of a ceramic material, together with one or more additives such as, for example, binders, lubricants, sintering aids, deflocculants, plasticizers, wetting agents, and filler materials (which may be used to define pores within the current collector 80 by subsequently removing the filler materials from the extruded structure). After extrusion, the precursor material may be consolidated by, for example, heating the precursor material to a temperature sufficient to cause sintering of the particles of ceramic material and densification of the extruded structure. The cells 72 then may be formed within the interior surfaces 82 of the current collector 102.

In additional embodiments, the current collector 102 may be formed by casting or molding a precursor material in a mold using pins or other inserts to define the interior surfaces 82 and the elongated channels 90 of the current collector 102. After molding or casting the precursor material, the precursor material may be consolidated as described above to form the current collector 102.

By providing a current collector 102 comprising a substantially monolithic unitary structure, as shown in FIG. 6, there is no need to provide electrical contact between various individual current collectors, such as the individual current collectors 86 previously described in relation to FIG. 5B, which may eliminate or substantially reduce contact resistance and enhance the performance of a fuel cell system or an electrolytic cell system employing such a monolithic unitary current collector 102 relative to known fuel cell systems and electrolytic cell systems.

Figure 7B:
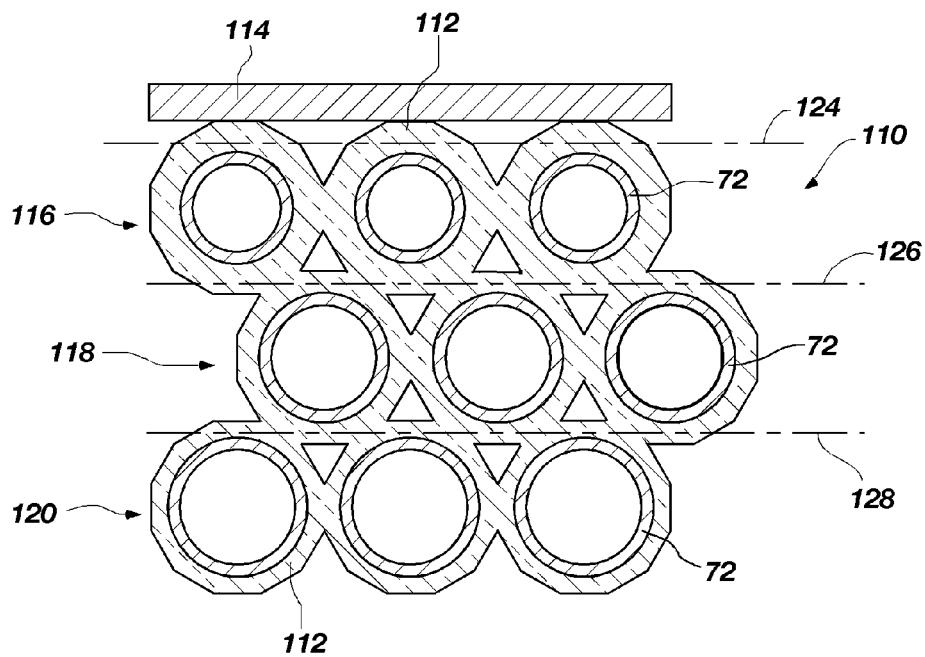
FIG. 7B is a cross-sectional view of the electrolytic/fuel cell bundle shown in FIG. 7A illustrating a current bus structure electrically coupled to the current collector.
Figure 7A:
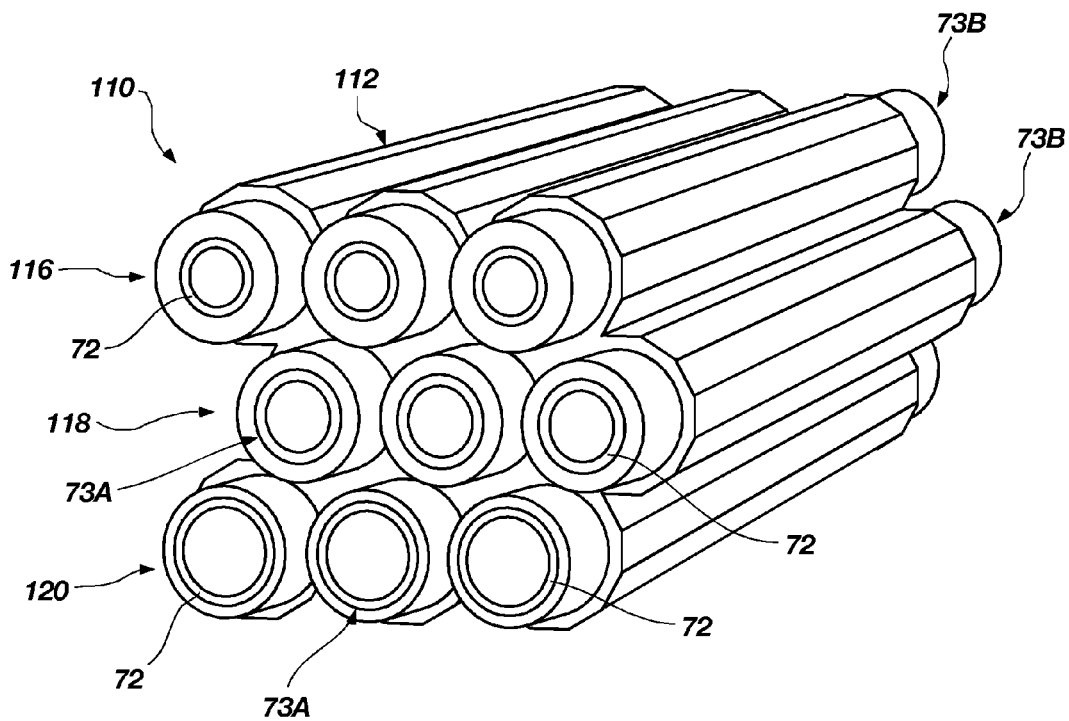
FIG. 7A is a perspective view of an additional example of an electrolytic/fuel cell bundle that embodies teachings of the present invention and includes a monolithic current collector having a cross-sectional area that varies in a direction generally parallel to a direction of current flow through the current collector.

Another electrolytic/fuel cell bundle 110 that embodies teachings of the present invention is shown in FIG. 7A. The electrolytic/fuel cell bundle 110 is substantially similar to the electrolytic/fuel cell bundle 100 shown in FIG. 6 and includes a current collector 112 that has a monolithic unitary structure and substantially surrounds each of a plurality of cells 72. The monolithic current collector 112, however, has a cross-sectional area that increases in a direction generally parallel to a direction of current flow through the current collector 112, as described in further detail below.

During operation of the electrolytic/fuel cell bundle 110, an electrically conductive current bus structure (not shown in FIG. 7A) may be used to electrically couple the current collector 112 to an external circuit. During operation, electrons may flow from the anodes of the cells 72 through the external circuit, the electrically conductive current bus structure, and the current collector 80 to the cathodes of the cells 72. The current bus structure may be electrically coupled to any point, points, or surfaces of the current collector 112, and the direction of current flow through the current collector 80 will at least partially depend upon where the current bus structure is electrically coupled to the current collector 112. As each point on the radially outer surface 77B of the outer electrode 76 (FIG. 5C) of each of the cells 72 may not be separated from the current bus structure by an equal distance, the magnitude of the current density (i.e., the ratio of the magnitude of current flowing in the current collector 112 to the cross-sectional area of the current collector 112 perpendicular to the direction of the current flow) may not be uniform throughout the current collector 112.

It may be desirable to maintain the current density in the current collector 112 below a threshold level to optimize performance of the electrolytic/fuel cell bundle 110. Furthermore, it may be desirable to provide a generally uniform current density throughout the current collector 112. The current collector 112 may have a cross-sectional area that varies (either increases or decreases) in a direction generally parallel to a direction of current flow through the current collector 112, so as to maintain the current density in the current collector 112 below a threshold level and/or to provide a generally uniform current density throughout the current collector 112.

Referring to FIG. 7B, by way of example and not limitation, an electrically conductive current bus structure 114 may be electrically coupled to one or more exterior surfaces of the current collector 112 on a side thereof adjacent a first row 116 of the cells 72 in the electrolytic/fuel cell bundle 110. The current bus structure 114 may be in electrical contact with the current collector 112 substantially along the length thereof. In this configuration, during operation of the electrolytic/fuel cell bundle 110, electrons may flow from the current bus structure 114 through the current collector 112 to the outer electrodes 76 of the cells 72 in each of the first row 116 of cells 72, the second row 118 of cells 72, and the third row 120 of cells 72. In this configuration, the current passing through the first plane 124 shown in FIG. 7B includes the current generated by the cells 72 in each of the three rows 116, 118, 120 of cells 72, while the current passing through the second plane 126 includes the current generated only by the second and third rows 118, 120 of cells 72, and the current passing through the third plane 128 includes the current generated only by the third row 120 of cells 72. As such, the cross-sectional area of the current collector 112 may decrease in the general direction of current flow through the current collector 112 (e.g., in the direction extending from the current bus structure 114 generally towards the third row 120 of cells 72).

In additional embodiments, if the outer electrode 76 of each of the cells 72 comprises an anode, the cross-sectional area of the current collector 112 may increase in the general direction of current flow through the current collector 112 (e.g., in the direction extending from the cells 72 generally towards the current bus structure 114).

The cross-sectional area of the current collector 112 may vary in a generally continuous manner and/or in a stepwise, generally discontinuous manner across the current collector 112. In the embodiment shown in FIGS. 7A and 7B, the current collector 112 is configured such that the wall thickness of the portion of the current collector 112 surrounding the cells 72 in the second row 118 is thicker than the portion of the current collector 112 surrounding the cells 72 in the third row 120, and the wall thickness of the portion of the current collector 112 surrounding the cells 72 in the first row 116 is thicker than the portion of the current collector 112 surrounding the cells 72 in the second row 118. In this manner, the cross-sectional area of the current collector 112 varies in a stepwise, generally discontinuous manner across the current collector 112. In additional embodiments, the cross-sectional area of the current collector 112 may vary in a generally continuous manner across the current collector 112.

In the embodiment shown in FIGS. 7A and 7B, the diameter of the cells 72 in the first row 116 is smaller than the diameter of the cells 72 in the second and third rows 118, 120, respectively, and the diameter of the cells 72 in the second row 118 is smaller than the diameter of the cells 72 in the third row 120. The amount of current generated by each of the cells 72 may be at least partially a function of the surface area of the inner electrode 74, outer electrode 76, and electrolyte layer 78, and hence, the diameter of each of the respective cells 72. As such, in the embodiment shown in FIGS. 7A and 7B, the cells 72 in the third row 120 may generate more current than the cells 72 in the second row 118, and the cells 72 in the first row 116 may generate more current than the cells 72 in the second row 118. In some embodiments of the present invention, it may be necessary or desirable to configure each of the cells 72 to generate substantially equal amounts of current, and as such, the cells 72 in each of the rows 116, 118, 120 may be the same size and have substantially identical diameters.

In additional embodiments of the present invention, the current bus structure 114 may be electrically coupled to the current collector 112 at an end thereof (e.g., the end of the current collector 112 proximate the open ends 73A (FIG. 7A) of the cells 72 or the opposite end of the current collector 112 proximate the closed ends 73B (FIG. 7A) of the cells 72). In such embodiments, the cross-sectional area of the current collector 112 may vary in a longitudinal direction along the current collector 112 parallel to the lengths of the cells 72.

By decreasing and/or maintaining generally uniform the current density within the current collector 80 during operation, the performance of a fuel cell system or an electrolytic cell system that utilizes the electrolytic/fuel cell bundle 70 shown in FIGS. 5A and 5B or the electrolytic/fuel cell bundle 100 shown in FIG. 6 may be enhanced relative to known fuel cell systems and electrolytic cell systems.

While each of the embodiments of electrolytic/fuel cell bundles described above includes cells 72 that are stacked in a hexagonal pattern or arrangement, the present invention is not so limited and includes electrolytic/fuel cell bundles that include cells 72 that are stacked in other arrangements.

Figure 8:
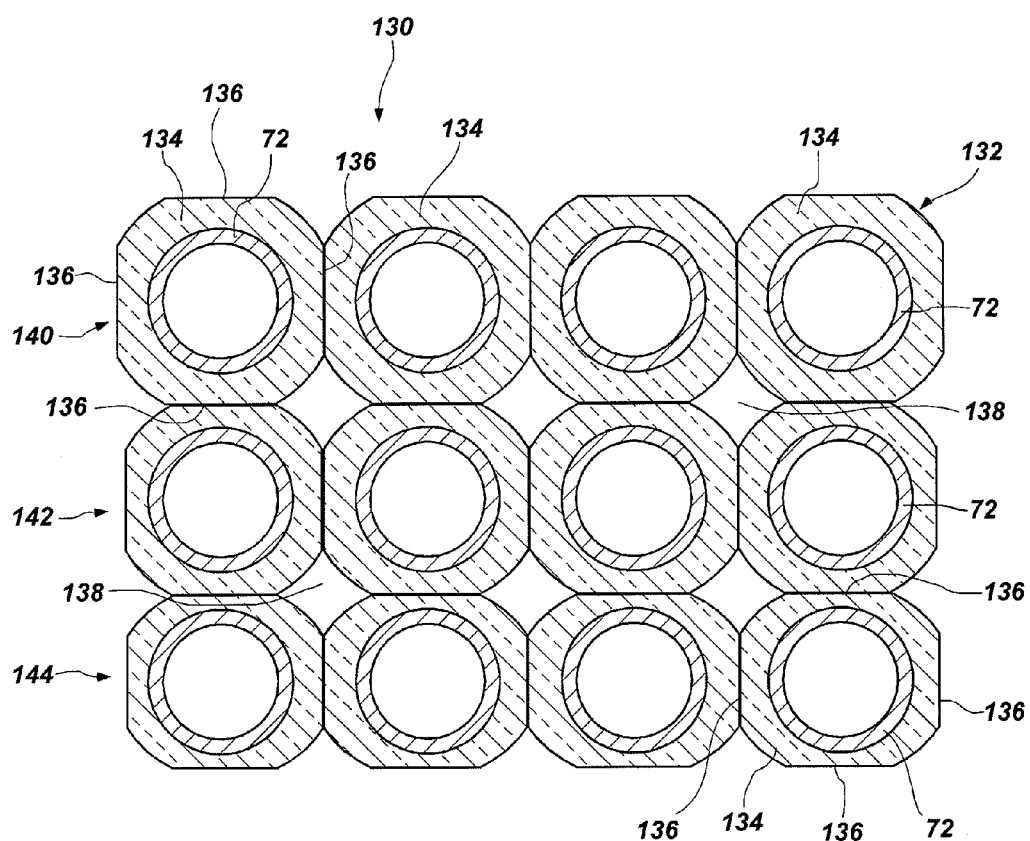
FIG. 8 is a perspective view of another example of an electrolytic/fuel cell bundle that embodies teachings of the present invention and includes a current collector comprised of a plurality of individual current collectors that each include flat or planar exterior surfaces and are stacked in a square or rectangular pattern, the current collector having a cross-sectional area that varies in a direction generally parallel to a direction of current flow through the current collector.

Another electrolytic/fuel cell bundle 130 that embodies teachings of the present invention is shown in FIG. 8. The electrolytic/fuel cell bundle 130 includes a plurality of generally tubular cells 72, as described above. In the embodiment shown in FIG. 8, however, the cells 72 are stacked in a square or rectangular pattern or arrangement, and each of the cells 72 has a substantially identical diameter, and hence, may generate a substantially similar amount of current during operation of the electrolytic/fuel cell bundle 130.

As shown in FIG. 8, the electrolytic/fuel cell bundle 130 further includes a current collector 132, which is comprised of a plurality of individual current collectors 134 that each correspond to one cell 72. Each of the individual current collectors 134 has a plurality of generally planar exterior surfaces 136, which may extend generally along the length of the individual current collectors 134. In the embodiment shown in FIG. 8, each of the individual current collectors 134 includes four generally planar exterior surfaces 136. In this configuration, the individual current collectors 134 may be stacked in the square or rectangular pattern, and the generally planar exterior surfaces 136 of each individual current collector 134 may be configured to abut against a generally planar exterior surface 136 of the adjacent, nearest-neighbor individual current collectors 134 in the electrolytic/fuel cell bundle 130. Furthermore, elongated channels 138 may be defined between the adjacent, nearest-neighbor individual current collectors 134, as shown in FIG. 8. In this configuration, a reductant (e.g., fuel) or an oxidant (e.g., air) may be caused to flow through the elongated channels 138, as well as over the exterior surfaces of the current collector 132, during operation of the cells 72 of the electrolytic/fuel cell bundle 130.

The current collector 132 may have a cross-sectional area that increases in a direction generally parallel to a direction of current flow through the current collector 132. As shown in FIG. 8, the electrolytic/fuel cell bundle 130 may include a plurality of rows of cells 72. By way of example and not limitation, the electrolytic/fuel cell bundle 130 may include a first row 140 of cells 72, a second row 142 of cells 72, and a third row 144 of cells 72. A thickness (e.g., a wall thickness) of the individual current collectors 134 corresponding to the cells 72 in the first row 140 may be greater than the thickness of the individual current collectors 134 corresponding to the cells 72 in the second row 142, and the thickness of the individual current collectors 134 corresponding to the cells 72 in the second row 142 may be greater than the thickness of the individual current collectors 134 corresponding to the cells 72 in the third row 144.

In some embodiments, the outer electrode 76 (FIG. 5C) of each of the cells 72 in the first, second, and third rows 140, 142, 144 may include a cathode. In this configuration, a current bus member 114 (FIG. 7B) may be electrically coupled to each of the individual current collectors 134 corresponding to cells 72 in the first row 140, and current may be caused to flow through the current collector 132 in a direction extending from the current bus member 114 generally towards the third row 144 of cells 72. In this configuration, the cross-sectional area of the current collector 132 may decrease across the current collector 132 in the general direction of current flow through the current collector 132.

In additional embodiments, the outer electrode 76 (FIG. 5C) of each of the cells 72 in the first, second, and third rows 140, 142, 144 may include an anode. In this configuration, a current bus member 114 (FIG. 7B) may be electrically coupled to each of the individual current collectors 134 corresponding to cells 72 in the first row 140, and current may be caused to flow through the current collector 132 in a direction parallel to a direction extending from the third row 144 of cells 72 generally towards the current bus member 114. In this configuration, the cross-sectional area of the current collector 132 may increase across the current collector 132 in the general direction of current flow through the current collector 132.

In yet another embodiment, a conductive bus member 114 (FIG. 7B) may be electrically coupled to the current collector 132 at an end thereof proximate the open ends 73A (FIGS. 5A and 7A) of the cells 72 or the closed ends 73B (FIGS. 5A and 7A) of the cells 72, and the cross-sectional area of each of the individual current collectors 134 (and, hence, the current collector 132) may increase in a longitudinal direction generally parallel to the longitudinal axis of the corresponding elongated tubular cell 72.

In each of the above described embodiments, a cross-sectional area of the current collector 132 varies in a direction generally parallel to a general direction of current flow through the current collector 132. In this configuration, the current density in the current collector 132 may be maintained below a threshold level, and/or the current density in the current collector 132 may be maintained substantially uniform.

Figure 9:
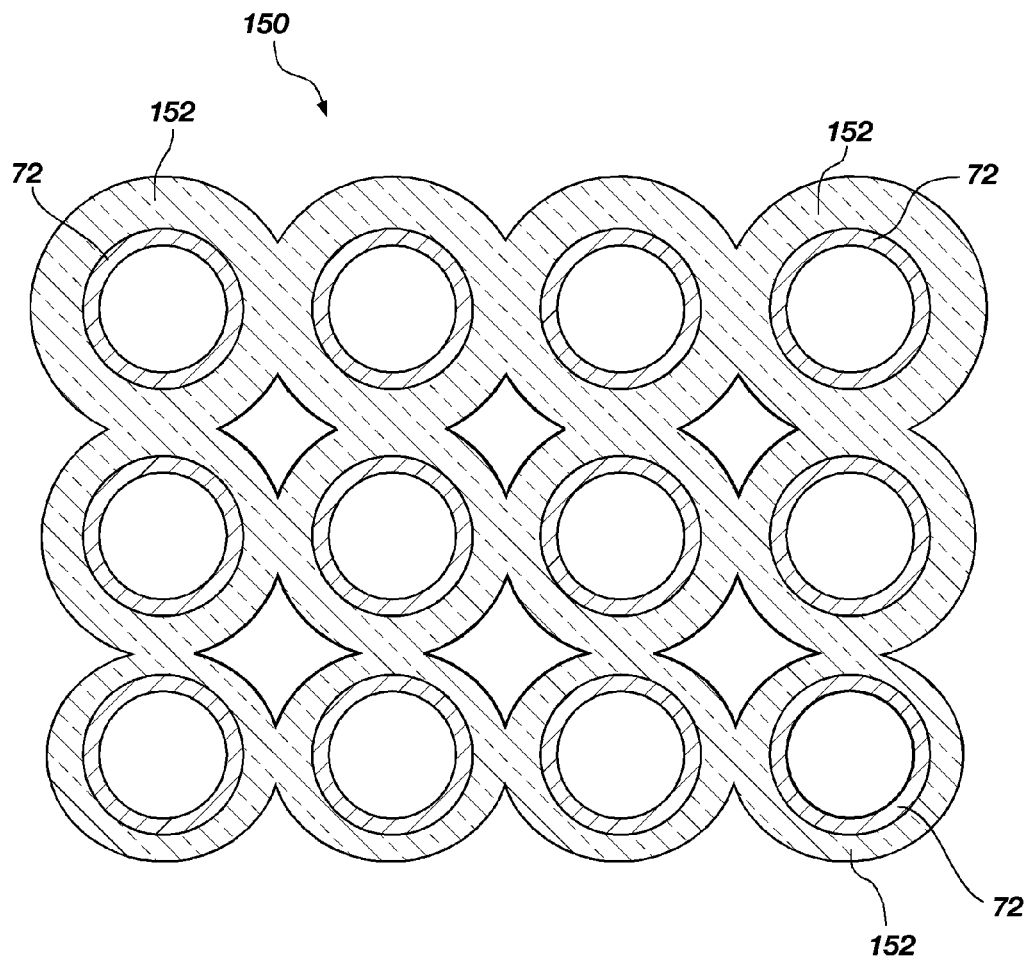
FIG. 9 is a perspective view of yet another example of an electrolytic/fuel cell bundle that embodies teachings of the present invention and includes a plurality of cells stacked in a square or rectangular pattern and a monolithic current collector having a cross-sectional area that varies in a direction generally parallel to a direction of current flow through the current collector.

Yet another electrolytic/fuel cell bundle 150 that embodies teachings of the present invention is shown in FIG. 9. The electrolytic/fuel cell bundle 150 is substantially similar to the electrolytic/fuel cell bundle 130 shown in FIG. 8 and includes a plurality of generally tubular cells 72, as described above, as well as a current collector 152. In contrast to the current collector 132 of the electrolytic/fuel cell bundle 130 shown in FIG. 8, however, the current collector 152 includes a monolithic unitary structure, substantially similar to the current collector 100 previously described with reference to FIG. 6.

By providing a current collector 152 comprising a substantially monolithic unitary structure, as shown in FIG. 9, there is no need to provide electrical contact between various individual current collectors, such as the individual current collectors 134 previously described in relation to FIG. 8, which may eliminate or substantially reduce contact resistance and enhance the performance of a fuel cell system or an electrolytic cell system employing such a monolithic unitary current collector 152 relative to known fuel cell systems and electrolytic cell systems.

Electrolytic/fuel cell bundles and systems that embody teachings of the present invention, such as those previously described herein, may have electrolytic/fuel cell packing arrangements that provide decreased overall volume of the electrolytic/fuel cells without a substantial decrease in efficiency thereof relative to known electrolytic/fuel cell bundles and systems. Additionally, by providing monolithic current collectors as described herein, contact resistance between individual current collectors may be substantially eliminated or reduced, thereby improving the efficiency of the electrolytic/fuel cell bundles and systems described herein relative to known electrolytic/fuel cell bundles and systems. Furthermore, by maintaining the current density in the current collectors below a threshold level and/or substantially uniform, as described above, the performance of the electrolytic/fuel cell bundles and systems described herein may be improved relative to known electrolytic/fuel cell bundles and systems.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electrolytic/fuel cell bundle comprising:
    a plurality of generally tubular cells, each generally tubular cell of the plurality comprising:
        an inner electrode;
        an outer electrode; and
        an electrolyte layer disposed between the inner electrode and the outer electrode;
    an electrically conductive current collector in electrical and structural communication with the outer electrode of each cell of the plurality of generally tubular cells; and
    an electrically conductive current bus structure electrically coupled to a surface of the electrically conductive current collector;
    wherein a cross-sectional area of the current collector in a first plane is greater than a cross-sectional area of the current collector in a second plane located a greater distance from the electrically conductive current bus structure relative to the first plane, the second plane oriented parallel to the first plane.

2. The electrolytic/fuel cell bundle of claim 1, wherein the cross-sectional area of the current collector increases continuously in the general direction of current flow through the current collector.

3. The electrolytic/fuel cell bundle of claim 1, wherein each cell of the plurality of cells has a hollow, generally cylindrical shape.

4. The electrolytic/fuel cell bundle of claim 3, wherein each cell of the plurality of cells comprises an inner anode, an outer cathode, and an electrolyte layer disposed between the anode and the cathode.

5. The electrolytic/fuel cell bundle of claim 4, wherein the current collector comprises a plurality of electrically interconnected individual current collectors, each individual current collector of the plurality of electrically interconnected individual current collectors corresponding to one cell of the plurality of cells and comprising a hollow, generally cylindrical shape and at least four generally planar exterior surfaces each circumferentially positioned about the exterior of the individual current collector to abut against a generally planar outer surface of another individual current collector corresponding to an adjacent cell of the plurality of cells.

6. The electrolytic/fuel cell bundle of claim 1, wherein the current collector comprises a porous monolithic structure substantially surrounding each cell of the plurality of generally tubular cells.

7. The electrolytic/fuel cell bundle of claim 6, further comprising a plurality of elongated channels extending through the current collector between the cells of the plurality of generally tubular cells.

8. The electrolytic/fuel cell bundle of claim 7, wherein the cells of the plurality of generally tubular cells are oriented substantially parallel to one another and disposed in a pattern comprising a plurality of cell rows.

9. The electrolytic/fuel cell bundle of claim 8, wherein the current bus structure is electrically coupled to at least one side surface of the current collector.

10. The electrolytic/fuel cell bundle of claim 8, wherein the current bus structure is electrically coupled to the current collector at an end thereof proximate an end of at least one cell of the plurality of generally tubular cells.

11. The electrolytic/fuel cell bundle of claim 8, wherein the cells of the plurality of cells are disposed in a hexagonal arrangement.

12. The electrolytic/fuel cell bundle of claim 11, wherein each elongated channel of the plurality of elongated channels is disposed within an interstitial space between three nearest-neighbor cells of the plurality of cells.

13. The electrolytic/fuel cell bundle of claim 12, wherein each elongated channel of the plurality of elongated channels has a generally triangular cross-sectional shape.

14. The electrolytic/fuel cell bundle of claim 1, wherein the current collector comprises a porous material.

15. The electrolytic/fuel cell bundle of claim 1, wherein the current collector has a size and shape configured to exhibit a substantially uniform current density through the current collector during operation.

16. An electrolytic/fuel cell bundle, comprising:
    a plurality of cells arranged in a plurality of rows, each cell of the plurality of cells comprising:
        a generally cylindrical inner electrode having an inner surface and an outer surface;
        a generally cylindrical outer electrode disposed concentrically around the inner electrode, the outer electrode having an inner surface and an outer surface;
        a generally cylindrical electrolyte layer disposed between the inner electrode and the outer electrode; and
        a current collector substantially surrounding the outer electrode, the current collector comprising at least six substantially planar exterior surfaces each extending substantially along a length of the cell, the at least six substantially planar exterior surfaces being circumferentially spaced around the cell;
    wherein a wall thickness of the current collector of the cells in one row of the plurality of rows is greater than a wall thickness of the current collector of the cells in another row of the plurality of rows.

17. The electrolytic/fuel cell bundle of claim 16, wherein the current collector of each cell of the plurality of cells comprises a porous monolithic structure substantially surrounding each cell of the plurality of cells.

18. The electrolytic/fuel cell bundle of claim 16, wherein the cells of the plurality of cells are oriented substantially parallel to one another and disposed in a hexagonal arrangement.

19. A system for generating electrical power or performing electrolysis, the system comprising:
at least one electrolytic/fuel cell bundle, the at least one electrolytic/fuel cell bundle comprising:
a plurality of generally tubular cells, each generally tubular cell comprising:
an inner electrode;
an outer electrode; and
an electrolyte layer disposed between the inner electrode and the outer electrode; and
an electrically conductive current collector in electrical and structural communication with the outer electrode of each cell of the plurality of generally; tubular cells; and
an electrically conductive current bus structure on a surface of the electrically conductive current collector;
wherein a cross-sectional area of the current collector in a first plane is greater than a cross-sectional area of the current collector in a second plane located a greater distance from the electrically conductive current bus structure relative to the first plane, the second plane oriented parallel to the first plane;
a reductant source configured to supply a reductant to a side of one of the inner electrode and the outer electrode of each cell opposite the electrolyte layer; and
an oxidant source configured to supply an oxidant for oxidizing the reductant to a side of the other of the inner electrode and the outer electrode of each cell opposite the electrolyte layer.

20. The system of claim 19, wherein the reductant source comprises a source of at least one of hydrogen, methane, and hydrocarbon molecules.

21. The system of claim 20, wherein the oxidant source comprises a source of oxygen.

22. The system of claim 19, wherein the cross-sectional area of the current collector decreases continuously in the general direction of current flow through the current collector.

23. The system of claim 19, wherein each cell of the plurality of generally tubular cells has a hollow, generally cylindrical shape.

24. The system of claim 23, wherein each cell of the plurality of generally tubular cells comprises an inner anode, an outer cathode, and an electrolyte layer disposed between the anode and the cathode.

25. The system of claim 24, wherein the current collector comprises a plurality of electrically interconnected individual current collectors, each individual current collector of the plurality of electrically interconnected individual current collectors corresponding to one cell of the plurality of generally tubular cells and comprising a hollow, generally cylindrical shape and at least four generally planar exterior surfaces each circumferentially positioned about an exterior surface of the individual current collector to abut against a generally planar outer surface of another individual current collector corresponding to an adjacent cell of the plurality of generally tubular cells.

26. The system of claim 24, wherein the current collector comprises a porous monolithic structure substantially surrounding each cell of the plurality of generally tubular cells.

27. The system of claim 26, further comprising a plurality of elongated channels extending through the current collector between the cells of the plurality of generally tubular cells.

28. The system of claim 27, wherein the cells of the plurality of generally tubular cells are oriented substantially parallel to one another and disposed in a pattern comprising a plurality of cell rows.

29. The system of claim 28, wherein the current bus structure is electrically coupled to at least one side surface of the current collector.

30. The system of claim 28, wherein the current bus structure is electrically coupled to the current collector at an end thereof proximate an end of at least one cell of the plurality of generally tubular cells.

31. The system of claim 28, wherein the cells of the plurality of generally tubular cells are disposed in a hexagonal arrangement.

32. The system of claim 31, wherein each elongated channel of the plurality of elongated channels is disposed within an interstitial space between three nearest-neighbor cells of the plurality of generally tubular cells.

33. The system of claim 32, wherein each elongated channel of the plurality of elongated channels has a generally triangular cross-sectional shape.

34. The system of claim 19, wherein the current collector comprises a porous material.

35. The system of claim 19, wherein the current collector is sized and configured to exhibit a substantially uniform current density through the current collector during operation.

36. A system for generating electrical power or performing electrolysis, the system comprising:
a plurality of cells arranged in a plurality of rows, each cell of the plurality of cells comprising:
a generally cylindrical inner electrode having an inner surface and an outer surface;
a generally cylindrical outer electrode disposed concentrically around the inner electrode, the outer electrode having an inner surface and an outer surface;
a generally cylindrical electrolyte layer disposed between the inner electrode and the outer electrode; and
a current collector substantially surrounding the outer electrode, the current collector comprising at least six substantially planar exterior surfaces each extending substantially along a length of the cell, the at least six substantially planar exterior surfaces being circumferentially spaced around the cell, wherein a wall thickness of the current collector of the cells in one row of the plurality of rows is greater than a wall thickness of the current collector of the cells in another row of the plurality of rows;
a reductant source configured to supply a reductant to a side of one of the inner electrode and the outer electrode of each cell opposite the electrolyte layer; and
an oxidant source configured to supply an oxidant for oxidizing the reductant to a side of the other of the inner electrode and the outer electrode of each cell opposite the electrolyte layer.

37. The system of claim 36, wherein the reductant source comprises a source of at least one of hydrogen, methane, and hydrocarbon molecules.

38. The system of claim 37, wherein the oxidant source comprises a source of oxygen.

39. The system of claim 36, wherein the current collector of each cell of the plurality of cells comprises a porous monolithic structure substantially surrounding the cell of the plurality of cells.

40. The system of claim 36, wherein the cells of the plurality of cells are oriented substantially parallel to one another and disposed in a hexagonal arrangement.

41. An electrolytic/fuel cell bundle comprising:
a plurality of generally tubular cells, each generally tubular cell comprising:
   an inner electrode;
   an outer electrode; and
   an electrolyte layer disposed between the inner electrode and the outer electrode;
a porous substantially monolithic current collector in electrical and structural communication with the outer electrode of each cell of the plurality of generally tubular cells; and
an electrically conductive current bus structure contacting the current collector, wherein the current collector has a cross-sectional area in a first plane that is greater than a cross-sectional area in a second plane located a greater distance from the electrically conductive current bus structure relative to the first plane, the second plane oriented parallel to the first plane.

42. The electrolytic/fuel cell bundle of claim 41, wherein a the current collector exhibits a substantially uniform current density through the current collector during operation.

43. The electrolytic/fuel cell bundle of claim 41, wherein the inner electrode comprises an anode, and the outer electrode comprises a cathode.

44. The electrolytic/fuel cell bundle of claim 41, further comprising a plurality of elongated channels extending through the current collector between the cells of the plurality of generally tubular cells.

45. The electrolytic/fuel cell bundle of claim 41, wherein the cells of the plurality of generally tubular cells are oriented substantially parallel to one another and disposed in a pattern comprising a plurality of cell rows.

46. The electrolytic/fuel cell bundle of claim 45, wherein the cells of the plurality of cells are disposed in a hexagonal arrangement.

* * * * *